(12) United States Patent
Xu et al.

(10) Patent No.: US 9,448,656 B2
(45) Date of Patent: Sep. 20, 2016

(54) CAPACITIVE IN-CELL TOUCH PANEL AND DISPLAY DEVICE

(71) Applicants: HEFEI BOE OPTOELECTRONICS TECHNOLOGY CO., LTD., Hefei, Anhui (CN); BOE TECHNOLOGY GROUP CO., LTD., Beijing (CN)

(72) Inventors: Yubo Xu, Beijing (CN); Zuquan Hu, Beijing (CN); Ming Hu, Beijing (CN); Byung Cheon Lim, Beijing (CN)

(73) Assignees: HEFEI BOE Optoelectronics Technology Co., Ltd., Hefei (CN); BOE Technology Group Co., Ltd., Beijing (CN)

( * ) Notice: Subject to any disclaimer, the term of this patent is extended or adjusted under 35 U.S.C. 154(b) by 316 days.

(21) Appl. No.: 14/343,277

(22) PCT Filed: May 8, 2013

(86) PCT No.: PCT/CN2013/075300
§ 371 (c)(1),
(2) Date: Mar. 6, 2014

(87) PCT Pub. No.: WO2014/153809
PCT Pub. Date: Oct. 2, 2014

(65) Prior Publication Data
US 2014/0320767 A1    Oct. 30, 2014

(30) Foreign Application Priority Data

Mar. 26, 2013   (CN) .......................... 2013 1 0099919

(51) Int. Cl.
G06F 3/045      (2006.01)
G06F 3/041      (2006.01)
G06F 3/044      (2006.01)

(52) U.S. Cl.
CPC ............. *G06F 3/0412* (2013.01); *G06F 3/044* (2013.01); *G06F 2203/04103* (2013.01)

(58) Field of Classification Search
CPC .................. G06F 2203/04103; G06F 3/0412; G06F 3/044
See application file for complete search history.

(56) References Cited

U.S. PATENT DOCUMENTS

2012/0086654 A1* 4/2012 Song ................... G06F 3/0412
                                                    345/173

2013/0063395 A1    3/2013  Byun et al.

FOREIGN PATENT DOCUMENTS

| CN | 101930132 A | 12/2010 |
| CN | 102445799 A | 5/2012 |
| CN | 102955621 A | 3/2013 |
| KR | 1020120036521 A | 9/2012 |
| KR | 1020130028628 A | 10/2013 |

OTHER PUBLICATIONS

International Search Report for International Application No. PCT/CN2013/075300, 10pgs.
Sep. 29, 2015—International Preliminary Report on Patentability Appn PCT/CN2013/075300.
Jan. 29, 2016—(KR)—Notice of Allowance Appn 10-2014-7005369.
May 20, 2015—(CN)—First Office Action for Appn 201310099919.6 with Eng Tran.

* cited by examiner

*Primary Examiner* — Kumar Patel
*Assistant Examiner* — Insa Sadio
(74) *Attorney, Agent, or Firm* — Banner & Witcoff, Ltd.

(57) ABSTRACT

Embodiments of the invention disclose a capacitive in-cell touch panel and a display device. The touch panel includes an array substrate and a counter substrate, the array substrate includes: pixels defined by gate lines and data lines and a common electrode corresponding to each pixel. All the common electrodes are divided into a plurality of first common electrode groups arranged in a row direction and a plurality of second common electrode groups arranged in a column direction; a plurality of metal wires disposed in a same metal layer, wherein all the metal wires are divided into a plurality of first metal wire groups arranged in the row direction and a plurality of second metal wire groups arranged in the column direction; the first metal wire groups in a direction of a same row are electrically connected to each other, and are electrically connected to first common electrode groups corresponding to them in position, respectively, so as to form a driving line; the second metal wire groups in a direction of a same column are electrically connected to each other, and are electrically connected to second common electrode groups corresponding to them in position, respectively, so as to form a sensing line.

12 Claims, 6 Drawing Sheets

CAPACITIVE IN-CELL TOUCH PANEL AND DISPLAY DEVICE

CROSS REFERENCE TO RELATED APPLICATIONS

This application is based on International Application No. PCT/CN2013/075300 filed on May 8, 2013, which claims priority to Chinese National Application No. 201310099919.6 filed on Mar. 26, 2013. The entire contents of each and every foregoing application are incorporated herein by reference.

TECHNICAL FIELD

Embodiments of the present invention relate to a capacitive in-cell touch panel and a display device.

BACKGROUND

With the rapid development of the display technology, touch panels (touch screen panels) have gradually spread into the fields of people's living. At present, touch panels can be classified into add-on mode touch panels, on-cell touch panels, and in-cell touch panels according to the structure. For an add-on touch panel, a touch panel and a liquid crystal display (LCD) are produced separately, and then they are attached to each other to form a liquid crystal display having a touch function. Add-on touch panels have higher production costs, lower light transmittance, and a thicker module. For a capacitive in-cell touch panel, touch electrodes of a touch panel are embedded the inside of a liquid crystal display. Because touch sensing circuits are implemented in a liquid crystal cell, the module can be made thinner, lighter and more cost-effective compared with other implementation ways of the touch panel.

Furthermore, in order to increase an aperture ratio of the touch panel to the maximum extent, a dual gate line structure can be employed upon design of a pixel structure in a TFT array substrate. As shown in FIG. 1, in the dual gate line structure, two gate signal lines (i.e. gate lines), such as Gate1 and Gate2, Gate3 and Gate4, Gate5 and Gate6, are provided between pixel units in adjacent rows on the TFT array substrate; every two adjacent columns of pixel units serve as a group, sharing a data line (i.e. data line) Date1, Date2, Date3 located between the two columns of pixel units. In this way, it is unnecessary to form data lines S1, S2 and S3 denoted by broken-lines in FIG. 1, namely, there is no data line in these places.

Typically, provision of driving lines and sensing lines that are cross and discrete from each other on the touch panel is realized with the combination of the above technologies, so as to achieve an object of touch display. However, the above productive technological processes are relatively complex, and resistance of the formed driving lines or sensing lines is relatively large. In terms of an advanced super dimension switch (ADS) mode, such issues exist as well.

SUMMARY

Embodiments of the invention provide a capacitive in-cell touch panel and a display device, for solving such a problem that resistances of driving lines and sensing lines in an ADS mode touch panel or a display device in prior art.

According to an embodiment of the invention, there is provided a capacitive in-cell touch panel, comprising an array substrate and a counter substrate, the array substrate including: a plurality of gate lines and a plurality of data lines; a plurality of pixels defined by the plurality of gate lines and the plurality of data lines, each of the pixels including a corresponding common electrode, wherein all the common electrodes are divided into a plurality of first common electrode groups arranged in a row direction and a plurality of second common electrode groups arranged in a column direction, and each first common electrode group and each second common electrode group are insulated from each other; a plurality of metal wires disposed in a same metal layer, wherein all the metal wires are divided into a plurality of first metal wire groups arranged in the row direction and a plurality of second metal wire groups arranged in the column direction, and each first metal wire group and each second metal wire group are insulated from each other; the first metal wire groups in a direction of a same row are electrically connected to each other, and are electrically connected to first common electrode groups corresponding to them in position, respectively, so as to form a driving line; the second metal wire groups in a direction of a same column are electrically connected to each other, and are electrically connected to second common electrode groups corresponding to them in position, respectively, so as to form a sensing line.

For example, the data lines include first data lines and second data lines that are arranged in parallel and alternately, wherein only the first data lines are adapted for load of a data signal; the first metal wire groups belonging to a same driving line are connected together through at least one of the metal wires, and the second metal wire groups belonging to the same sensing line are connected together through the second data lines; or, the first metal wire groups belonging to the same driving line are connected together through the second data lines, and the second metal wire groups belonging to the same sensing line are connected together through at least one of the metal wires.

For example, where the second metal wire groups belonging to a same sensing line are connected together through the second data lines, at least one wire of each second metal wire group is connected to the second data lines through a via hole.

Also for example, where the first metal wire groups belonging to a same driving line are connected together through the second data lines, at least one wire of each first metal wire group is connected to the second data lines through a via hole.

For example, the first data lines and the second data lines are disposed on the same layer.

For example, all common electrodes in each of the first common electrode groups belonging to a same driving line are formed into an integrate configuration by interconnection.

For example, all common electrodes in each of the second common electrode groups belonging to a same sensing line are formed into an integrate configuration by interconnection.

For example, part of the metal wires correspond to the gate lines in position, and other part of the metal wires correspond to the data lines in position.

For example, each of the pixels further includes a pixel electrode, and the pixel electrode and the common electrode for the pixel are disposed on different layers.

For example, the metal layer is disposed on a different layer from the gate lines and the data lines.

For example, each row of the metal wires is a whole metal wire, or, each row of the metal wires includes at least two discrete wires.

For example, each of the first metal wire groups and each of the second metal wire groups includes a number of metal wires that are disposed to cross over and electrically connected to one another.

According to another embodiment of the invention, there is provided a display device, comprising any touch panel as stated above.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which falls within the scope sought for protection by the invention.

Unless otherwise defined, the technical terminology or scientific terminology used herein should have the same meaning as commonly understood by one of ordinary skill in the art to which this invention belongs. Terms such as "first", "second" and the like used in specification and claims of the patent application of the invention do not show any order, number or importance, but are only used to distinguish different constituent parts. Likewise, a term such as "a," "an," or the like does not indicate limitation in number, but specifies the presence of at least one. A term such as "comprises," "comprising," "includes," "including", "contains" or the like means that an element or article ahead of this term encompasses element(s) or article(s) listed behind this term and its (their) equivalents, but does not preclude the presence of other elements or articles. A term such as "connection," "connected," or the like is not limited to physical or mechanical connection, but can include electrical connection, whether directly or indirectly. Terms such as "on," "below," "left," "right," "row," "column" or the like is only used to describe a relative position relationship, and where the absolute position of a described object is changed, the relative position relationship might also be changed accordingly. For example, after the described objected is rotated by 90 degrees, "row" and "column" will be interchanged from the point of an observer.

According to a first embodiment of the invention, there is provided a touch panel, comprising an array substrate and a counter substrate, which are disposed in opposition to each other, and bonded together by, such as a sealant, to form a liquid crystal cell with a liquid crystal material filled therein. The touch panel is an in-cell liquid crystal touch panel. The counter substrate is such as a color filter substrate, with color filters such as red, green and blue (RGB) color filters corresponding to pixels on the array substrate formed thereon. Where color filters are formed on the array substrate (namely, the array substrate is a COA substrate), it is unnecessary to provide color filters on the counter substrate further.

Figure 1:
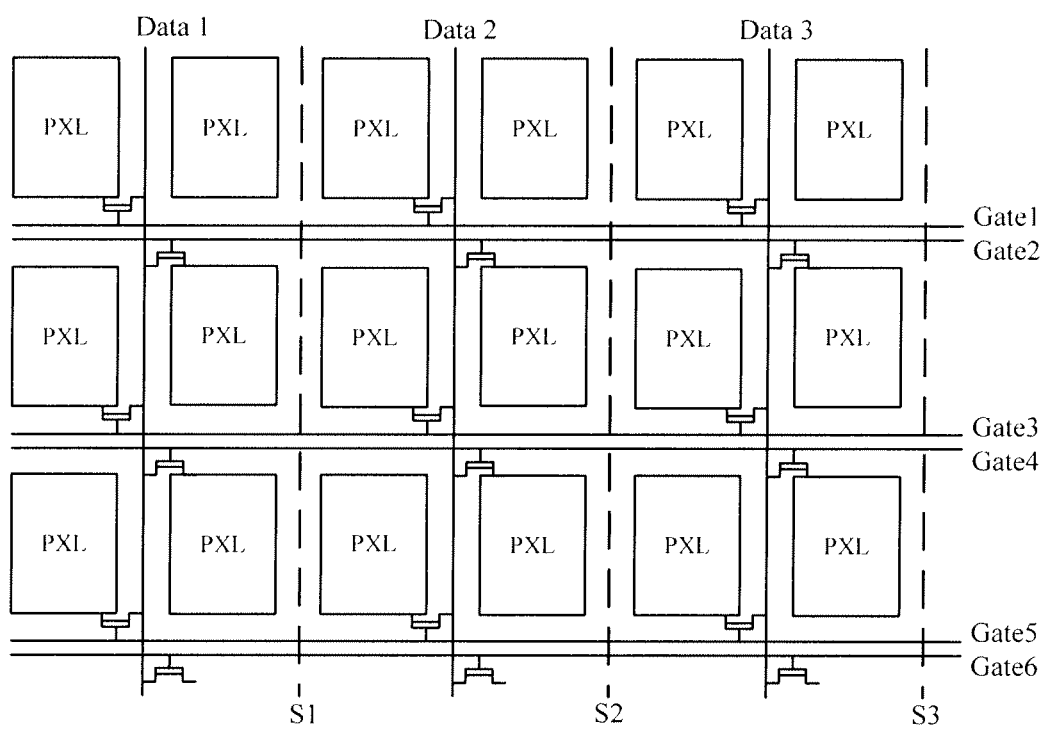
FIG. 1 is a structurally schematic view illustrating a dual-gate structure in a display panel in prior art.
Figure 2:
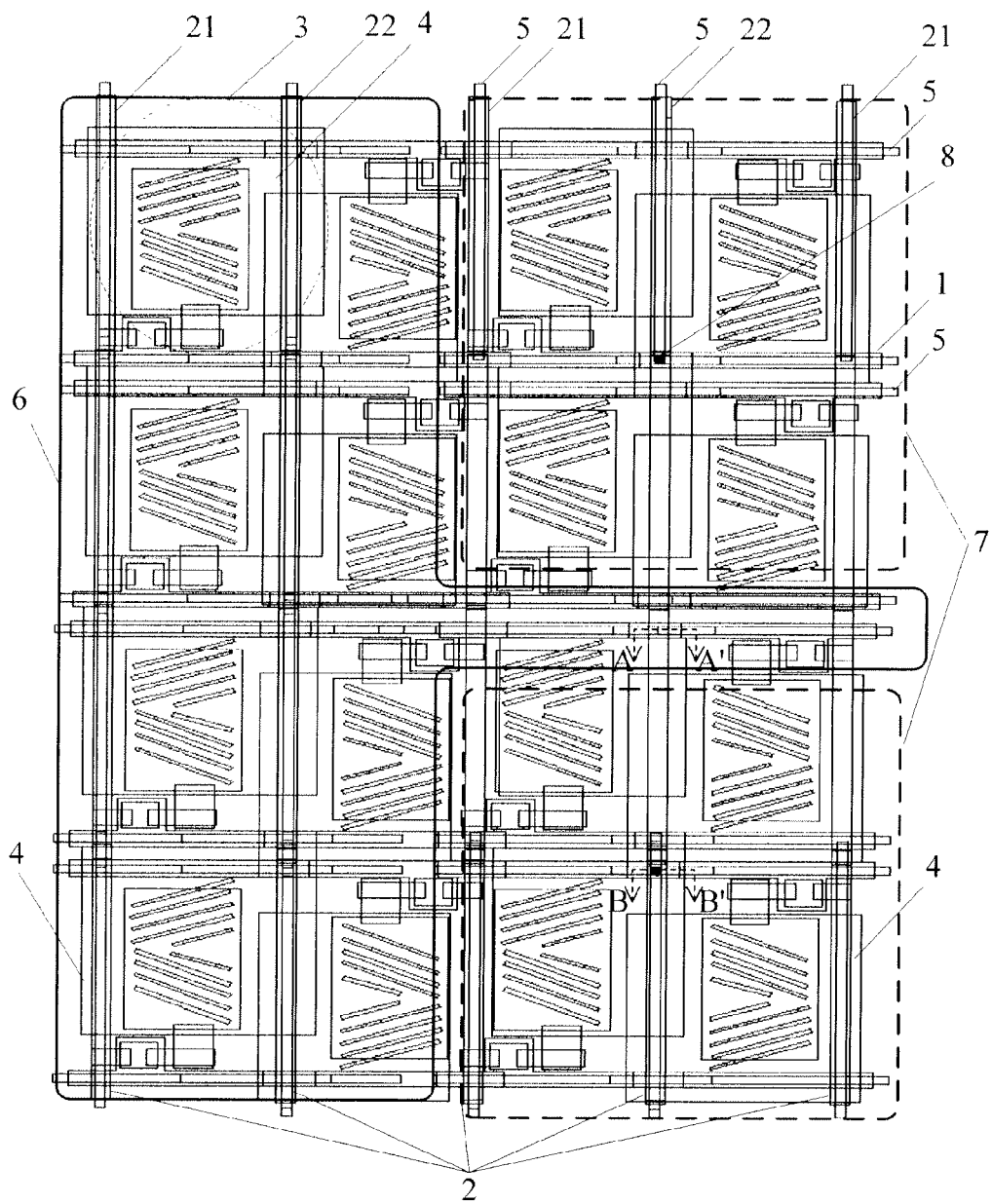
FIG. 2 is a structurally schematic view illustrating a touch panel as stated in a first embodiment of the invention.

As shown in FIG. 2, the array substrate of the touch panel includes: a plurality of gate lines 1, a plurality of data lines 2, and a plurality of pixels 3 defined by intersection of the plurality of gate lines 1 and the plurality of data lines 2, each of the plurality of pixels 3 having a corresponding common electrode 4.

As shown in FIG. 2, in the touch panel, with a dual-gate structure, the plurality of gate lines 1 are parallel to each other and extend in the row direction, and two gate lines 1 are provided between adjacent rows of pixels; the plurality of data lines 2 are parallel to each other and extend in the column direction, and each of the data lines 2 is interposed between adjacent columns of pixels.

The pixels 3 are arranged in the form of an array, sixteen pixels are shown in FIG. 2, and obviously, the invention is not limited thereto. Each pixel includes a thin film transistor functioning as a switch element and a pixel electrode and a common electrode that are used to form a liquid crystal capacitor for control of alignment of liquid crystals. For example, for the thin film transistor of each pixel, its gate electrode is electrically connected to or integrally formed with a corresponding gate line, its source electrode is electrically connected to or integrally formed with a corresponding data line, and its drain electrode is electrically connected to or integrally formed with a corresponding pixel electrode. The pixel electrode and the common electrode are located on different layers, and for example the common electrode is located above the pixel electrode; and the pixel electrode and the common electrode may be comb-like electrodes (slit electrodes).

Each thin film transistor is such as of a bottom-gate type, and then the array substrate includes the gate electrode, a gate insulating layer, a semiconductor layer, and the source electrode and the drain electrode in sequence from bottom to top from a base substrate (not shown). The gate electrode is located, for example, in a gate-line metal layer, and the source electrode and the drain electrode are located, for example, in a data-line metal layer (e.g., with reference to FIG. 5). A passivation layer is formed over the whole array substrate including the thin film transistor.

Figure 3:
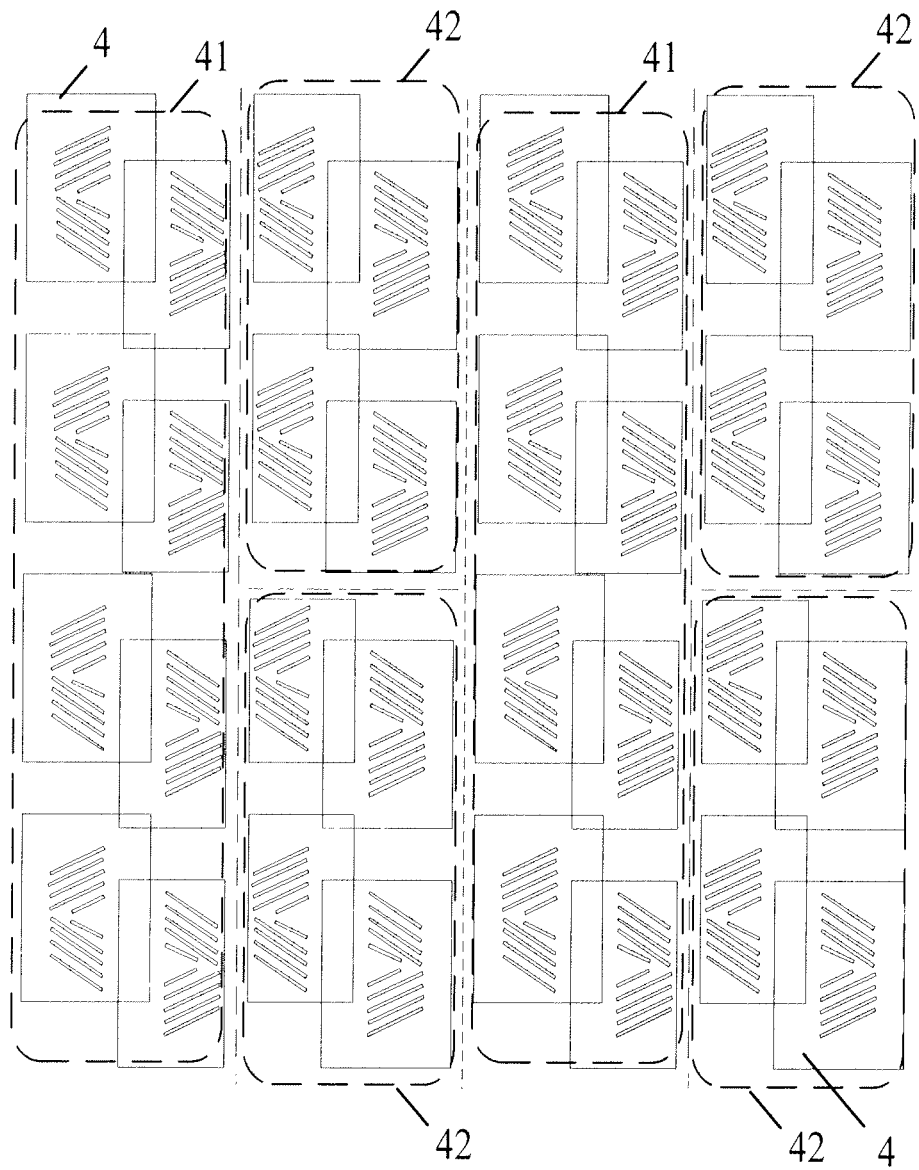
FIG. 3 is a schematic view illustrating first common electrode groups and second common electrode groups in the first embodiment of the invention.

As shown in FIG. 3, in the embodiment, all the common electrodes 4 are divided into a plurality of first common electrode groups 41 arranged in the row direction and a plurality of second common electrode groups 42 arranged in the column direction, and each first common electrode group 41 and each second common electrode group 42 are insulated from each other. Referring to FIG. 2 also, in the exemplary sixteen pixels arranged in the form of an array, for example, each of the first common electrode groups 41 includes common electrodes in two adjacent columns in a total of eight pixels, which common electrodes are electrically connected to each other; while each of the second common electrode groups 42 includes common electrodes in two adjacent columns in a total of four pixels, which common electrodes are electrically connected to each other, and there are two adjacent second common electrode groups 42 in one column. In this way, the first common electrode groups 41 and the second common electrode groups 42 are arranged alternately in the row direction. The invention is not limited to the composition and arrangement mode of the first common electrode groups 41 and the second common electrode groups 42 as stated above.

The array substrate of the touch panel further includes a metal layer, which includes a plurality of metal wires 5. For example, part of the metal wires 5 correspond to the gate lines 1 in position, are formed above the gate lines 1 and overlap with the gate lines, other part of the metal wires 5 correspond to the data lines 2 in position, are formed above the data lines 2 and overlap with the data lines.

Figure 4:
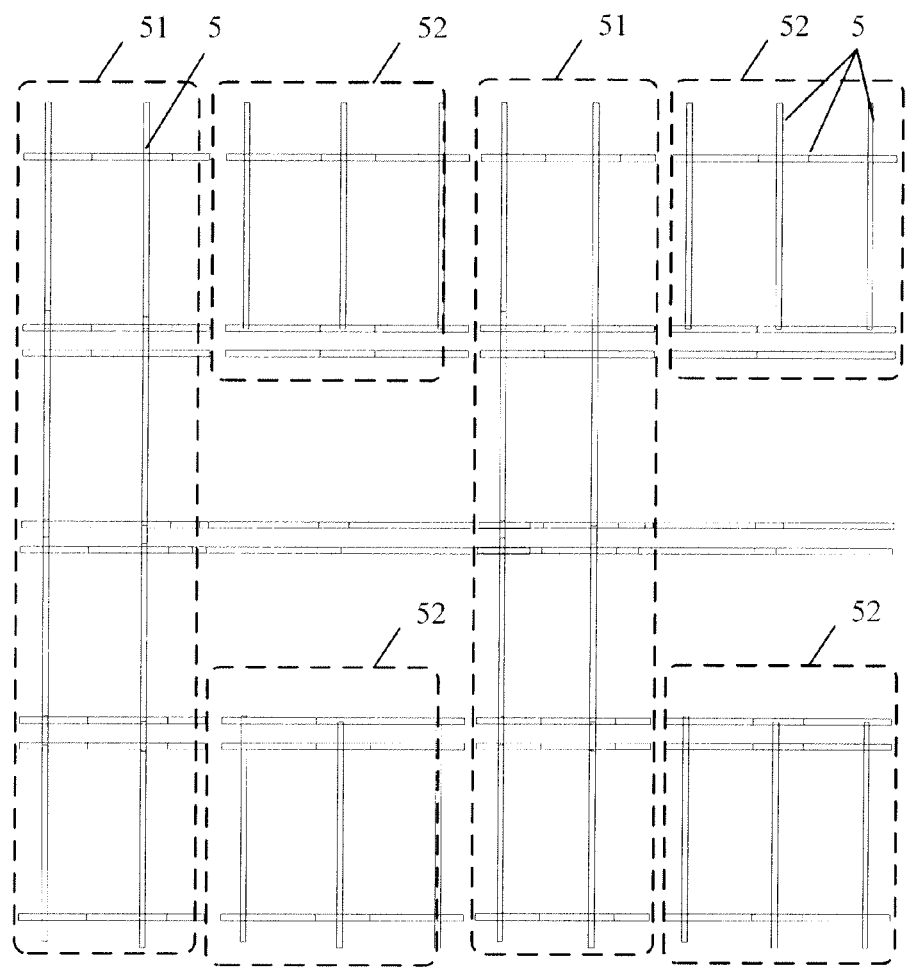
FIG. 4 is a schematic view illustrating first metal wire groups and second metal wire groups in the first embodiment of the invention.

As shown in FIG. 4, all the metal wires 5 are divided into a plurality of first metal wire groups 51 arranged in the row direction and a plurality of second metal wire groups 52 arranged in the column direction. Each first metal wire group 51 and each second metal wire group 52 can include a number of metal wires 5 that are respectively disposed to cross over and electrically connected to one another. Referring to FIG. 2 also, for example, in sixteen pixels arranged in the form of an array, each of the first metal wire groups 51 corresponds to the total of eight adjacent pixels in two adjacent columns; while each of the second metal wire groups 52 corresponds to the total of four adjacent pixels in two adjacent columns, and there are two adjacent second metal wire groups 52 in one column. Thus, the first metal wire groups 51 and the second metal wire groups 52 are arranged alternately in the row direction and insulated from each other. The invention is not limited to the composition and arrangement mode of the first metal wire groups 51 and the second metal wire groups 52 as stated above.

The first metal wire groups 51 in the direction of the same row are electrically connected to each other. In the embodiment shown in FIG. 4, the first metal wire groups 51 separated from each other by two second metal wire groups 52 are electrically connected to each other via metal wires 5 located between the two second metal wire groups 52, and are electrically connected to the first common electrode groups 41 corresponding to them in position, respectively, so as to form a driving line 6. Thus, in the embodiment, driving lines 6 extend in the row direction as a whole.

The second metal wire groups 52 in the direction of the same column are electrically connected to each other, and are electrically connected to the second common electrode groups 42 corresponding to them in position, respectively, so as to form a sensing line 7. In the embodiment, sensing lines 7 extend in the column direction as a whole. The driving lines 6 and the sensing lines 7 overlap with each other.

It is to be noted that, in the embodiment, where the metal layer in which the metal wires 5 are provided and a transparent electrode layer in which the common electrodes 4 are provided are two layers adjacent to each other (namely, the two layers are in contact with each other), the metal wires 5 and the corresponding common electrodes 4 can be directly connected in electricity without via holes. And where the metal layer in which the metal wires 5 are provided and a transparent electrode layer in which the common electrodes 4 are provided are not adjacent to each other, for example, they are separated from each other by an insulating layer, the metal wires 5 and the corresponding common electrodes 4 can be electrically connected through via holes formed in the insulating layer.

For each of the first common electrode groups 41 that belong to a same driving line 6, adjacent common electrodes 4 included by the group can be formed into an integrate configuration by connection; for each of the second common electrode groups 42 that belong to the same sensing line 7, adjacent common electrodes 4 included by the group can be formed into an integrate configuration by connection.

For example, the metal wires 5 and the gate lines 1 and the data lines 2 are located on different layers, such as, separated by insulating layers. For example, each row of the metal wires is a whole metal wire 5, or each row of the metal wires includes at least two separate metal wires 5.

In an embodiment of the invention, data lines 2 employed in the dual-gate drive structure includes first data lines 21 and second data lines 22 that are arranged in parallel and alternately; and only the first data lines 21 serve for loading or transmitting data signals. Moreover, the first data lines 21 and the second data lines 22 are provided on the same layer, namely, they are formed by a same conductive layer.

In the ADS mode touch panel according to the embodiment, due to the adoption of the dual-gate-line structure, only the first data lines 21 serve for transmission of the data signal, every two adjacent columns of pixels serve as a group, sharing one of the data lines 21 located between the two columns of pixels; and the second data lines 22 adjacent to them are in a stand-by status. Because part of the metal wires 5 are disposed in correspondence with the data lines 2 (including the first data lines 21 and the second data lines 22), and are located in a layer different from the data lines 2, the stand-by second data lines 22 can be used as wires for connecting either nonadjacent first metal wire groups 51 or nonadjacent second metal wire groups 52. The connecting configuration, for example, will be described below.

The first metal wire groups 51 belonging to a same driving line 6 are connected together through at least one metal wire 5, and the second metal wire groups 52 belonging to a same sensing line 7 are connected together through a second data line 22, which are illustrated by the embodiment in FIGS. 2 and 4. Or, in another embodiment, the first metal wire groups 51 belonging to a same driving line 6 are connected together through a second data line 22, and the second metal wire groups 52 belonging to a same sensing line 7 are connected together through at least one metal wire 5.

For example, where the second metal wire groups 52 belonging to a same sensing line 7 are connected together through a corresponding second data line 22, a metal wire 5 that corresponds to the second data line 22 in position in each of the second metal wire groups 52 is connected to the second data line 22 through a via hole 8. Thus, the second data line 22 acts to connect second metal wire groups 52 that are adjacent in the column direction together.

Further, for example, in another embodiment, where the first metal wire groups 51 belonging to a same driving line 6 are connected together through a corresponding second data line 22, a metal wire 5 that corresponds to the second data line 22 in position in each of the first metal wire groups 51 is connected to the second data line 22 through a via hole 8. Thus, the second data line 22 acts to connect first metal wire groups 51 that are adjacent in the column direction together.

According to the embodiments of the invention, driving lines 6 and sensing lines 7 of the touch panel, for example, may have the following two kinds of configurations.

1. The first common electrode groups 41 belonging to a same driving line 6 are not connected, the first metal wire groups 51 of the driving line 6 are connected together through at least one metal wire 5; the second metal wire groups 52 belonging to a same sensing line 7 are connected through a corresponding second data line 22.

2. The first metal wire groups 51 belong to a same driving line 6 are connected together through at least one metal wire 5; the second metal wire groups 52 belonging to a same sensing line 7 are connected through a corresponding second data line 22. This configuration differs from the first kind of configuration in that, the first common electrode groups 41 of the driving line 6 are connected through a common electrode line (e.g., formed of a transparent conductive material for manufacturing common electrodes).

Figure 5:
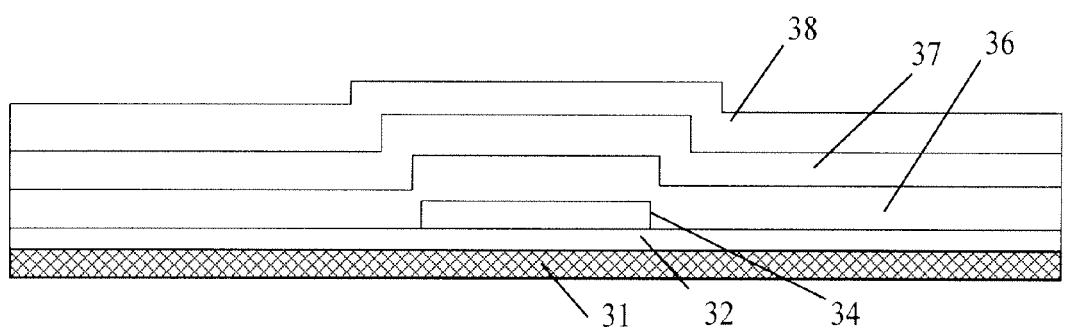
FIG. 5 is a schematic view illustrating a cross-section view taken along line A-A' in FIG. 2 in the first embodiment of the invention.

In accordance with the first kind of configuration, FIG. 5 shows a cross-section view taken along line A-A' in FIG. 2, in which a gate-line metal layer 31 (corresponding to a gate line 1 here), a gate insulating layer 32, a data-line metal layer 34 (corresponding to a data line 22 here), a passivation layer 36, a metal layer 37 (corresponding to a wire 5 here) and a common electrode layer 38 that corresponds to a common electrode of a pixel at the cross-section position, are included. The metal layer 37 and the common electrode layer 38 are in direct contact.

Figure 6:
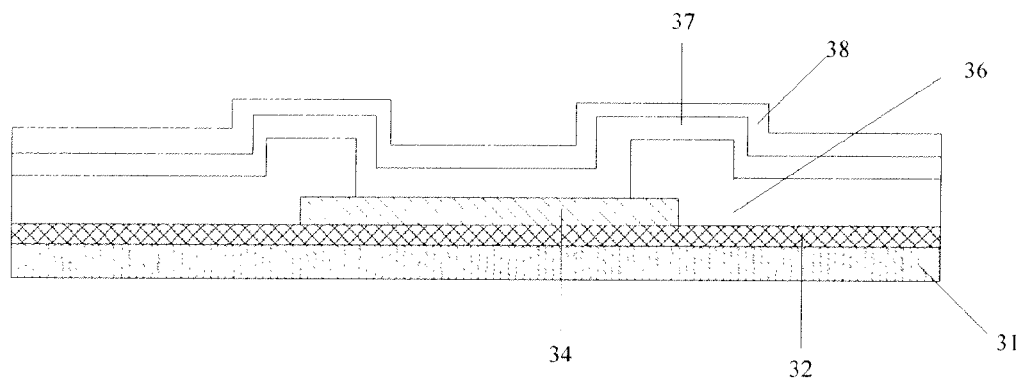
FIG. 6 is a schematic view illustrating a cross-section view taken along line B-B' in FIG. 2 in the first embodiment of the invention.
Figure 7:
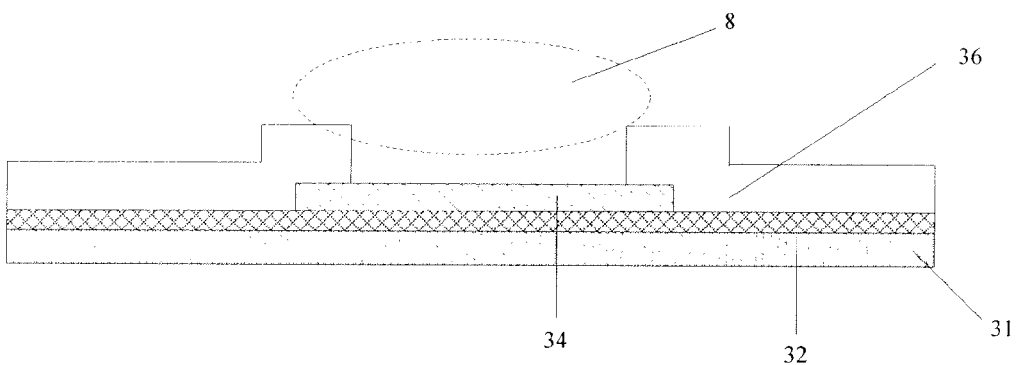
FIG. 7 is a schematic view illustrating a via hole after the cross section is taken along line B-B' in FIG. 2 in the first embodiment of the invention.

FIG. 6 shows a cross-section view taken along line B-B' in FIG. 2, in which a gate-line metal layer 31 (corresponding to a gate line 1 here), a gate insulating layer 32, a data-line metal layer 34 (corresponding to a data line 22 here), a passivation layer 36, a metal layer 37 (corresponding to a wire 5 here) and a common electrode layer 38 are included. It further includes a via hole 8 as shown in FIG. 7, which is formed in the passivation layer 36 and acts to connect a metal wire in a second metal wire group 52 and a second data line 22.

The second kind of configuration is similar to the first kind of configuration, and will not be illustrated repetitively here.

Figure 8:
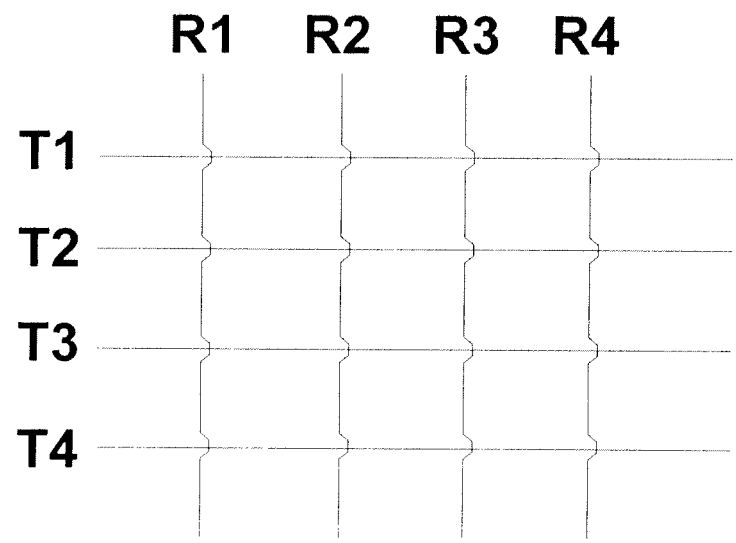
FIG. 8 illustrates a schematic circuit diagram for implementing the touch function of the touch panel according to an embodiment of the invention.

FIG. 8 illustrates a schematic circuit diagram for implementing the touch function of the touch panel according to an embodiment of the invention. As shown in FIG. 8, a plurality of signal lines T (e.g., driving lines 6) extend in the row direction, and a plurality of signal lines (e.g., sensing lines 7) extend in the column direction. The two kinds of signal lines intersect each other and overlap with each other at the intersection, so that a large number of mutual capacitors are formed throughout the entire touch panel. Where a finger or conductor contacts with the touch panel, induction capacitance between a horizontal wire and a vertical wire will be changed; a signal is transmitted by a signal line Tx, and the sensed signal is received by a signal line Rx. Where the mutual capacitance between the two are changed due to finger contact or contact of a conductor with the touch panel, a signal due to the change can be received by the signal line Rx, and then are detected and calculated by a control chip to obtain the touch location.

Figure 9:
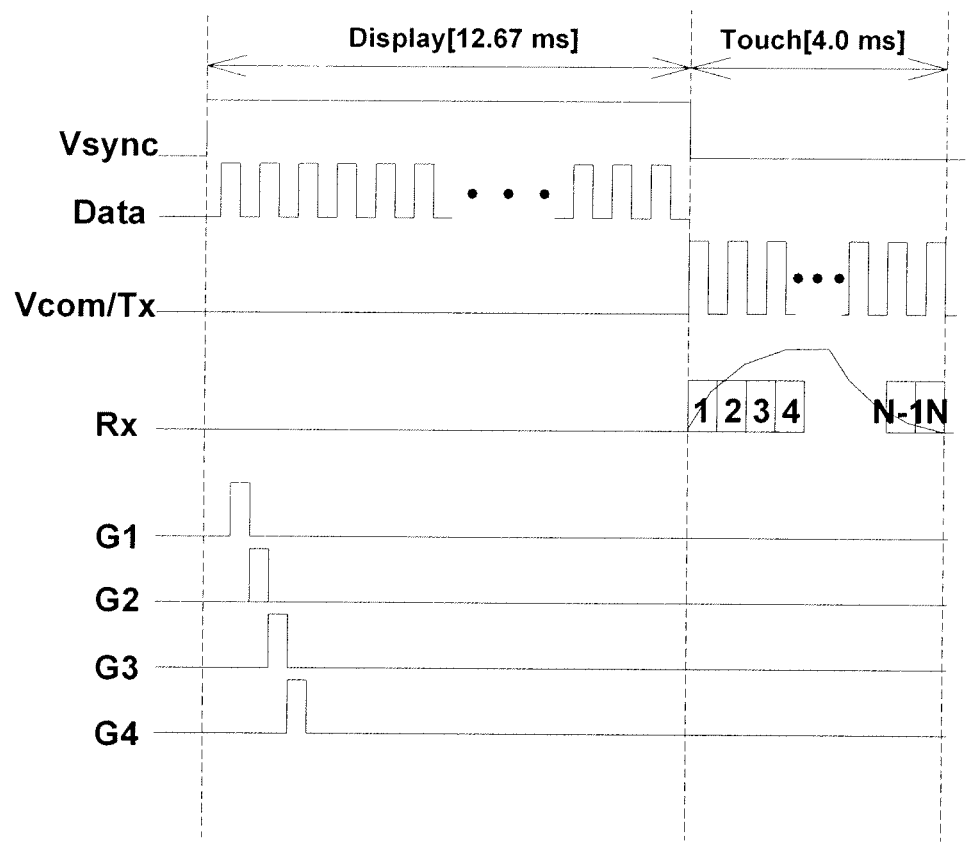
FIG. 9 shows a work timing schematic diagram of a touch panel according to an embodiment of the invention.

FIG. 9 shows a work timing schematic diagram of a touch panel according to an embodiment of the invention. For example, during the time period when a single frame of picture is displayed, the touch panel undergoes through a normal display operation in the time period of about early ¾ frame, and undergoes through a touch detection operation in the time period of about later ¼ frame. When the touch panel operates in the time period of touch detection, each pixel operates at a stage of hold state, and in this way, it is possible that not only a normal display can be conducted on the touch panel, but also a touch function can be achieved on the touch panel. As shown in the example of FIG. 9, within the time period of one frame (e.g., corresponding to 60 Hz), in the time period of early 12.67 ms, the touch panel is in a normal display state, and at this time Vcom/Tx is maintained at a direct current signal, and signal on the signal line Rx remains unchanged because the touch function has not been opened; in the time period of later 4.0 ms of the frame, Coin/Tx line has a high-frequency signal superposed thereon, and at this time, sensed high-frequency signals are received by the respective Rx lines. In case of a touch operation, the amplitude of the high-frequency signal on a corresponding Rx line changes, thus the location of the touch can be spotted. After the touch function of the touch panel is started, the gate lines for pixels of the touch panel are each in a turned-off state, and electric potential of each pixel is in a hold state.

In the above embodiments of the invention, the ADS mode touch panel includes an additional metal layer, with a plurality of metal wires disposed within the metal layer. For example, part of the metal wires correspond to the gate lines in position, and other part of the metal wires correspond to the data lines. For each of a driving line and a sensing line in the ADS mode touch panel, it not only includes a number of grouped common electrodes, and further includes metal wires electrically connected to the common electrodes, so as to reduce resistances of the driving line and the sensing line.

According to a second embodiment of the invention, there is provided a display device, comprising the touch panel stated in the first embodiment. The display device is for example a liquid crystal display such as an ADS mode liquid crystal display.

According to a third embodiment of the invention, there is provided a method for manufacturing the touch panel in the first embodiment. Steps of the method will be described as follows.

Step 1, a substrate is provided, patterns of a gate electrode and a gate-line metal layer that includes a number of gate lines are formed. These gate lines are arranged in correspondence with a dual-gate structure.

Step 2, a pattern of a gate insulating layer is formed on the substrate with the above patterns being formed thereon.

Step 3, a pattern of an active layer is formed on the substrate with the above patterns being formed thereon.

Step 4, patterns of a data-line metal layer and source and drain electrodes are formed on the substrate with the above patterns being formed thereon, and the data-line metal layer includes a plurality of data lines. The data lines include first data lines and second data lines that are arranged alternately, only the first data lines serve for transmitting data signals, and the second data lines are used as connecting conductors.

Step 5, a pattern of a pixel electrode is formed on the substrate with the above patterns being formed thereon.

Step 6, a pattern of a passivation layer is formed on the substrate with the above patterns being formed thereon, and the passivation layer includes a number of via holes therein.

Step 7, a metal layer including a plurality of metal wires is formed on the substrate with the above patterns being formed thereon. For example, part of the metal wires correspond to the gate lines in position, other part of the metal wires correspond to the data lines in position, all the metal wires are divided into a plurality of first metal wire groups arranged in the row direction and a plurality of second metal wire groups arranged in the column direction, and each first metal wire group and each second metal wire group are insulated from each other. For each first metal wire group and each second metal wire group, each of them includes a number of metal wires that are disposed to cross over and electrically connected to one another.

Step 8, a common electrode layer provided with common electrodes in correspondence with pixels is formed on the substrate with the above patterns being formed thereon. All the common electrodes are divided into a plurality of first common electrode groups arranged in a row direction and a plurality of second common electrode groups arranged in a column direction, and each first common electrode group and each second common electrode group are insulated from each other.

After completion of the step 8, for example, the first metal wire groups in the direction of a same row are electrically connected to each other, and electrically connected to first common electrode groups corresponding to them in position, respectively, so as to form a driving line; for example, the second metal wire group in the direction of a same column are electrically connected to each other, and electrically connected to second common electrode groups corresponding to them in position, respectively, so as to form a sensing line.

In the ADS mode touch panel according to any of the embodiments of the invention, there is provided an additional metal layer with a plurality of metal wires disposed therein. Part of the metal wires correspond to the gate lines in position, and other part of the metal wires correspond to the data lines. Therefore, in the ADS mode touch panel, each of a driving line and a sensing line includes a number of grouped common electrodes and the wires electrically connected to the corresponding common electrodes included by this line, so that resistances of the driving line and the sensing line can be reduced. Furthermore, the manufacturing method can be obtained as long as the process for forming the metal layer is added into an original manufacturing process, and is simple to implement.

Descriptions made above are merely exemplary embodiments of the invention, but are not used to limit the protection scope of the invention. The protection scope of the invention is determined by attached claims.

The invention claimed is:

1. A capacitive in-cell touch panel, comprising an array substrate and a counter substrate, the array substrate including:
   a plurality of gate lines and a plurality of data lines;
   a plurality of pixels defined by the plurality of gate lines and the plurality of data lines, each of the pixels including a corresponding common electrode, wherein all the common electrodes are divided into a plurality of first common electrode groups arranged in a row direction and a plurality of second common electrode groups arranged in a column direction, and each first common electrode group and each second common electrode group are insulated from each other;
   a plurality of metal wires disposed in a same metal layer, wherein all the metal wires are divided into a plurality of first metal wire groups arranged in the row direction and a plurality of second metal wire groups arranged in the column direction, and each first metal wire group and each second metal wire group are insulated from each other;
   the first metal wire groups in a direction of a same row are electrically connected to each other, and are electrically connected to first common electrode groups corresponding to them in position, respectively, so as to form a driving line;
   the second metal wire groups in a direction of a same column are electrically connected to each other, and are electrically connected to second common electrode groups corresponding to them in position, respectively, so as to form a sensing line;
   wherein the data lines include first data lines and second data lines that are arranged in parallel and alternately, wherein only the first data lines are adapted for load of a data signal;
   the first metal wire groups belonging to a same driving line are connected together through at least one of the metal wires, and the second metal wire groups belonging to a same sensing line are connected together through the second data liens; or
   the first metal wire groups belonging to the same driving line are connected together through a second data lines, and the second metal wire groups belonging to a same sensing line are connected together through at least one of the metal wires.

2. The touch panel of claim 1, wherein where the second metal wire groups belonging to a same sensing line are connected together through the second data lines, at least one metal wire of each second metal wire group is connected to the second data lines through a via hole.

3. The touch panel of claim 1, wherein where the first metal wire groups belonging to a same driving line are connected together through the second data lines, at least one wire of each first metal wire group is connected to the second data lines through a via hole.

4. The touch panel of claim 1, wherein the first data lines and the second data lines are disposed on a same layer.

5. The touch panel of claim 1, wherein all common electrodes in each of the first common electrode groups belonging to a same driving line are formed into an integrate configuration by interconnection.

6. The touch panel of claim 1, wherein all common electrodes in each of the second common electrode groups belonging to a same sensing line are formed into an integrate configuration by interconnection.

7. The touch panel of claim 1, wherein part of the metal wires correspond to the gate lines in position, and other part of the metal wires correspond to the data lines in position.

8. The touch panel of claim 1, wherein each of the pixels further includes a pixel electrode, and the pixel electrode and the common electrode for the pixel are disposed on different layers.

9. The touch panel of claim 1, wherein the metal layer is disposed on a different layer from the gate lines and the data lines.

10. The touch panel of claim 1, wherein each row of the metal wires is a whole metal wire, or, each row of the metal wires includes at least two discrete wires.

11. The touch panel of claim 1, wherein each of the first metal wire groups and each of the second metal wire groups includes a number of metal wires that are disposed to cross over and electrically connected to one another.

12. A display device, comprising the touch panel of claim 1.

* * * * *